United States Patent [19]

Talignani

[11] Patent Number: 5,478,588
[45] Date of Patent: Dec. 26, 1995

[54] SPREADABLE, AERATED CONFECTIONARY PRODUCT BASED ON WATER-IN-OIL EMULSION

[75] Inventor: Amilcare Talignani, Milan, Italy

[73] Assignee: Orlando Nuovi Investimenti Alimentari S.r.l., Milan, Italy

[21] Appl. No.: 249,289

[22] Filed: May 26, 1994

[30] Foreign Application Priority Data

May 31, 1993 [IT] Italy ................... MI93A1133

[51] Int. Cl.6 ................... A23G 3/00
[52] U.S. Cl. ............ 426/572; 426/582; 426/613; 426/660
[58] Field of Search ............ 426/572, 660, 426/659, 583

[56] References Cited

U.S. PATENT DOCUMENTS 3,620,757  11/1971  Ellinger et al. ............ 426/572
4,992,290  2/1991  Bastetti et al. ............ 426/572
5,244,675  9/1993  Talignani ............ 426/572

FOREIGN PATENT DOCUMENTS 0398408  11/1990  European Pat. Off. .
0441494  8/1991  European Pat. Off. .
294403  10/1991  Germany .
2208296  3/1989  United Kingdom .

*Primary Examiner*—Jeanette Hunter
*Attorney, Agent, or Firm*—Hedman, Gibson & Costigan

[57] ABSTRACT

Spreadable, aerated confectionery product of the kind constituted by an emulsion of "water-in-oil" type, characterized in that the continuous oil phase in said emulsion is constituted by a mixture of fats, and the water phase in said emulsion comprises sugars and whey proteins, substantially in absence of casein.

10 Claims, No Drawings

5,478,588

SPREADABLE, AERATED CONFECTIONARY PRODUCT BASED ON WATER-IN-OIL EMULSION

The present invention relates to a spreadable confectionery product, of creamy character in aerated form, suitable for being extruded for being used as a stuffing for cookies, or of chocolate creams.

In patent literature, examples are disclosed of products which take advantage of the combination of proteins and fats in order to obtain a spreadable creamy structure, which may be either aerated or less.

From literature references, as well as from operating practice, it is well known that the presence of even small amounts of fats annuls the capability of proteins of acquiring an aerated creamy structure by whipping. An example is given by the production of meringues.

In order to obtain a structure like the one which is the object of the present invention, the use of milk derivatives, such as cream, cheese or condensed milk or fresh milk in large amounts, or of complete milk proteins (caseins+lactalbumins) or of casein alone, or salts thereof, is normally recommended.

French patent 2,165,202 mentions the preparation of a proteinic cream based on molten cheese and one or more of the following ingredients: milk powder, cream, butter fat, casein and whey, with all of said ingredients being submitted to aeration under pressure.

U.S. Pat. No. 4,623,551 discloses the preparation of a proteinic cream based on an albumin foam, the stabilization of which is obtained by means of the addition of cheese, i.e., a casein-containing product.

U.S. Pat. No. 4,482,575 discloses the preparation of an aerated cream based on a foam of whey proteins, still containing mixtures of cheese powders, i.e. casein-containing products.

U.S. Pat. No. 4,298,625 teaches the preparation of an aerated proteinic cream based on milk derivatives with a lactalbumin:casein ratio comprised within the range of from 1 to 2.8–3.2.

U.S. Pat. No. 4,855,155 similarly teaches the preparation of an aerated proteinic cream based on fresh milk or condensed milk (therefore, still with casein being present), the structuring of which is carried out by the controlled crystallization of the fatty phase and pH control in order to attain precise modifications of proteinic fraction viscosity.

U.K. patent 1,261,910 teaches the preparation of an aerated spreadable cream based on an emulsion containing milk powder or casein (also from cheese), or lactalbumins, the structuring of which is carried out by modifying the nature of the proteinic fraction by Lactobacillus.

U.S. Pat. No. 3,851,070 teaches the preparation of a spreadable cream based on a soy protein containing emulsion, the structuring of which takes place by chemical modification of viscosity (pH modification).

U.S. Pat. No. 4,051,269 teaches the preparation of a spreadable, high-protein margarine, in particular using lactalbumins, which, however, precisely due to the incompatible lactalbumin-fat combination, is not aeratable.

The purpose of the present invention is of obtaining a confectionery product by starting from characteristic milk derivatives (which, however, are known to be incompatible with fatty substances, which decrease their surface tension in aqueous solution), which can also be aerated, with a stable, extrudible structure, as a stuffing for cookies or chocolate being formed, and identifiable as a typical milk product, for consumption as a snack.

The desired product should display spreadability characteristics and a high-protein nutritional profile.

The casein-containing products known from the prior art result to be easily aeratable because the caseinic fraction, as it occurs in ice cream, is not influenced by fat. On the contrary, as it results from recent studies on dispersed phases, precisely from the combination of casein and fat (any types of fats) and their specific ratio, the possibility derives of forming and stabilizing an aerated structure [examples are whipped cream, ice cream, "semifreddo" (Italian soft ice cream), whipped topping].

Casein does not undergo denaturation and does not loose this capability even when it is submitted to heat treatments.

According to the present invention, the present Applicant surprisingly found now that the above disclosed characteristics can be obtained with a spreadable, aerated confectionery product of the kind constituted by an emulsion of "water-in-oil" type, characterized in that the continuous oil phase in said emulsion is constituted by a mixture of fats, and the water phase in said emulsion comprises sugars and whey proteins, substantially in absence of casein.

The product according to the present invention contains therefore, as proteins, the byproduct from milk curd (i.e., whey) in all of its possible forms: whey, butter milk, concentrated lactalbumins, ultrafiltered lactalbumins, ricotta (cottage cheese from whey), quark, and so forth. Suitable for that purpose are proteins having, e.g., a composition falling within the following range:

| | |
|---|---|
| proteinic content (N × 6,38) | from 10 to 96.38% |
| fat content | from 0.4 to 7.5% |
| lactose content | from 0.5 to 55% |
| ash content | from 2 to 13% |
| moisture | from 4 to 6% |

Such a proteinic preparate is used according to the present invention in an emulsion of water-in-oil (W/O) emulsion in order to prepare a mix which, after being suitably sweetened, can be aerated and extruded.

In the product according to the present invention, the oil phase contains fats selected from vegetable fats, butter and high-melting fatty acid fractions, and the aqueous phase can contain such sugars as saccharose, inverted sugar, dextrose, honey and proteins from whey.

According to an embodiment of the present invention, the product is characterized in that it contains fresh cream.

According to a further embodiment, the product is characterized in that it contains living lactic yeasts.

Furthermore, the product may contain proteinic integrators derived from soy beans, sunflower.

The product according to the present invention can contain, as shortening in the oil phase, a refined or hydrogenated vegetable oil ("hardstock") with a melting point comprised within the range of from 26° to 36° C.

According to further embodiment, the product can contain, as its proteinic component, whey from which lactose is totally or partially removed, in order to reduce the risk of grittiness or of crystallization of sugar phases.

The present invention also relates to a process for preparing the confectionery product as defined above. Said process comprises the following steps:

(a) Preparation of a water-in-oil emulsion using, e.g., 50–65% of an aqueous dispersed phase and 50–35% of a continuous oil phase.

The aqueous dispersed phase is prepared by dissolving the proteins, such as protein powder or quark or cottage cheese, and the sugar fraction (saccharose and/or starch syrup and/or inverted sugar and/or honey) in water, with stirring, until a complete solution is obtained.

The oil continuous phase is prepared by dissolving the vegetable fat and/or butter and the high-melting fraction which guides the crystallization, besides the emulsifier, at 60° C. This fraction is then cooled, with stirring, down to 40° C.

The oil fraction with the temperature of 40° C. is added to the aqueous fraction kept at room temperature (20°–24° C.).

The resulting blend is mixed with high-speed stirring in a cooled planetary mixer until a homogeneous structure is obtained.

(b) The resulting blend is cooled down to a lower temperature than 20° C.

(c) The cooled blend is admixed with flavours or other taste conferring elements such as cocoa, hazelnut paste, and so forth, and is slowly mixed in order to obtain a regular, smooth blend.

(d) The blend is submitted to continuous or intermittent mechanical whipping with or without simultaneous forced injection of air or other food gases (e.g., nitrogen, carbon dioxide, and so forth).

(e) The product, aerated down to a bulk density comprised within the range of from 0.600 to 0.900, is extruded on cookies, or is filled in cups or containers.

In order to better understand the characteristics of the invention, some non-limitative examples thereof are disclosed in the following.

EXAMPLE 1

In order to obtain 100 kg of product with creamy consistency, the following procedure is used:

A—Aqueous phase

A premix of a—25,000 kg of sugar 10.800 kg of 75% ultrafiltered whey protein is prepared.

b—16,200 kg of water 6,000 kg of 70% inverted sugar are mixed until complete dissolution takes place.

c—The (a) mixture powder is added to (b) solution until complete dispersion.

B—Oil phase a—13,000 kg of refined palm oil 2.500 kg of butter 1.200 kg of high-boiling triglyceride fraction with >$C_{20}$ chain.

0.300 kg of monoglycerides 10,000 kg of refined coconut oil 14.000 kg of vegetable margarine are melted at 60° C., the molten mass at 60° C. is cooled down to 40° C. with stirring.

C—Water-in-oil emulsion

The aqueous phase is slowly added to the oil phase at 40° C., by operating with a suitable jacketed planetary mixed kept cooled at a lower temperature than 20° C.

D—Flavouring

To the emulsion (c), 1 kg of soluble cocoa powder is added.

E—The blend is whipped with a continuous facility and air injection, and is then extruded.

From this recipe, a mix is obtained which displays the following characteristics:

| fats | 37.5% |
|---|---|
| lactalbumin | 8.1% |
| caseins | 0% |
| sugars | 30.1% |
| water | 20.8% |

EXAMPLE 2

In order to obtain 100 kg of product with a creamy consistency, the following procedure is used:

A—Aqueous phase a—in a planetary mixer 20.000 kg of cottage cheese (or quark)

6.000 kg of 70% inverted sugar are mixed until a homogenous dispersion is obtained.

b—25.000 kg of icing sugar is added to the above mix inside said planetary mixer, until a smooth, homogenous mix is obtained.

B—Oil phase a—13.000 kg of refined palm oil 2.500 kg of butter 1.000 kg of high-boiling triglyceride fraction with >$C_{20}$ chain.

0.500 kg of monoglycerides 17.000 kg of refined coconut oil 14.000 kg of vegetable margarine are melted at 60° C., the molten mass at 60° C. is cooled down to 40° C. with stirring.

C—Water-in-oil emulsion

The aqueous phase is slowly added to the oil phase at 40° C., by operating in a suitable jacketed planetary mixer kept cooled at a lower temperature than 20° C.

D—Flavouring

To the emulsion (c), 1 kg of soluble cocoa powder is added.

E—The blend is whipped with a continuous facility and air injection, and is then extruded.

From this recipe, a mix is obtained which displays the following characteristics:

| fats | 41.20% |
|---|---|
| lactalbumins | 2.40% |
| caseins | 0.1% |
| sugars | 29.2% |
| water | 18.6% |

I claim:

1. Spreadable, aerated confectionery product which comprises a water-in-oil emulsion wherein the continuous oil phase in said emulsion is constituted by a mixture of fats selected from the group consisting of vegetable fats, butter, cream and high melting fatty acid fractions and the aqueous dispersed phase in said emulsion comprises sugars and whey proteins, substantially free of casein.

2. Product according to claim 1, wherein the aqueous dispersed phase contains a sugar selected form the group consisting of saccharose, inverted sugar, dextrose, honey and whey proteins.

3. Product according to claim 1 wherein said continuous oil phase contains fresh cream.

4. Product according to claim 1, wherein said product also contains living lactic yeasts.

5. Product according to claim 1, wherein said product contains protein dispersants derived from soy beans or sunflower.

6. Product according to claim 1, wherein the continuous oil phase the vegetable fat is hydrogenated vegetable oil with a melting point comprised within the range of from 26° to 36° C.

7. Product according to claim 1, wherein said product contains, as whey derivatives, whey from which lactose is totally or partially removed.

8. Product according to claim 1, wherein said product is obtained by means of a process which comprises the following steps:

a—melting the oil phase;

b—separately preparing the aqueous phase with whey proteins;

c—preparing the water-in-oil emulsion, by combining the oil phase from step (a) with the aqueous phase from step (c) at a controlled temperature;

d—cooling the emulsion;

e—if so desired, adding any further components; and f—introducing air into the so obtained plastic mix.

9. Process for preparing a confectionery product according to claim 1, which comprises the following steps:

a—melting the oil phase;

b—separately preparing the aqueous phase with whey proteins;

c—preparing the water-in-oil emulsion, by combining the oil phase from step (a) with the aqueous phase from step (c) at a controlled temperature;

d—cooling the emulsion;

e—adding any further components; and f—introducing air into the so obtained plastic mix.

10. Product according to claim 1, wherein said continuous oil phase comprises 50–35% and the aqueous dispersed phase comprises 50–65%.

* * * * *